United States Patent
Guillaume et al.

(10) Patent No.: US 11,614,554 B2
(45) Date of Patent: Mar. 28, 2023

(54) VELOCITY MODEL BUILDING FOR SEISMIC DATA PROCESSING USING PP-PS TOMOGRAPHY WITH CO-DEPTHING CONSTRAINT

(71) Applicant: CGG SERVICES SA, Massy (FR)

(72) Inventors: Patrice Guillaume, Orsay (FR); Francesco Perrone, Crawley (GB)

(73) Assignee: CGG SERVICES SAS, Massy (FR)

( * ) Notice: Subject to any disclaimer, the term of this patent is extended or adjusted under 35 U.S.C. 154(b) by 347 days.

(21) Appl. No.: 15/111,011

(22) PCT Filed: Jan. 13, 2015

(86) PCT No.: PCT/IB2015/000236
§ 371 (c)(1),
(2) Date: Jul. 12, 2016

(87) PCT Pub. No.: WO2015/104640
PCT Pub. Date: Jul. 16, 2015

(65) Prior Publication Data
US 2016/0341835 A1    Nov. 24, 2016

Related U.S. Application Data

(60) Provisional application No. 61/926,449, filed on Jan. 13, 2014.

(51) Int. Cl.
*G01V 1/28*    (2006.01)
*G01V 1/30*    (2006.01)

(52) U.S. Cl.
CPC ............. *G01V 1/282* (2013.01); *G01V 1/303* (2013.01); *G01V 2210/59* (2013.01); *G01V 2210/6222* (2013.01)

(58) Field of Classification Search
CPC .......... G01V 1/282; G01V 1/30; G01V 1/306; G01V 1/303; G01V 2210/59; G01V 2210/6222

See application file for complete search history.

(56) References Cited

U.S. PATENT DOCUMENTS

| | | | |
|---|---|---|---|
| 6,577,955 | B2 | 6/2003 | Guillaume |
| 6,611,764 | B2 | 8/2003 | Zhang |
| 7,082,368 | B2 | 7/2006 | Nickel |
| 7,660,202 | B2 | 2/2010 | Zou et al. |

(Continued)

FOREIGN PATENT DOCUMENTS

| | | |
|---|---|---|
| CN | 102914796 A | 2/2013 |
| CN | 103472482 A | 12/2013 |

OTHER PUBLICATIONS

European Office Action, dated Jun. 12, 2018, from corresponding European Application No. 15 711 564.3 (D1 previously cited in an Information Disclosure Statement on Dec. 13, 2017).

(Continued)

*Primary Examiner* — Kyle R Quigley
(74) *Attorney, Agent, or Firm* — Patent Portfolio Builders PLLC

(57) ABSTRACT

Methods and systems for processing seismic data are presented. Primary wave (P) seismic data (PP data) and shear wave (P) seismic data (PS data) are jointly inverted as part of a nonlinear tomography process which adheres to one or more co-depthing constraints.

16 Claims, 14 Drawing Sheets

(56) References Cited

U.S. PATENT DOCUMENTS

| | | |
|---|---|---|
| 8,379,482 B1 | 2/2013 | Khare et al. |
| 2010/0177595 A1 | 7/2010 | Khare et al. |
| 2011/0134722 A1* | 6/2011 | Virgilio .................... G01V 1/30 367/75 |
| 2013/0185032 A1* | 7/2013 | Archer ................ G06F 17/5009 703/2 |
| 2014/0200814 A1 | 7/2014 | Guillaume et al. |

OTHER PUBLICATIONS

Patrice Guillaume et al., "Multi-layer non-linear slope tomography", 75th EAGE Conference & Exhibition, Jun. 10-13, 2013, London, United Kingdom, pp. 1-6.
F. R. Adler, et al.; Nonlinear 3D tomographic least-squares inversion of residual move-out in Kirchhoff pre-stack depth migration common-image gathers, Geophysics, vol. 73, No. 5; Sep.-Oct. 2008; pp. VE13-VE23.
P. Berthet, et al.: "PP and PS travel time reflection anisotropic tomography on a case study"; Amsterdam 63rd Ann. Internat. Mtg. EAGE; June 11-15, 201; pp. 1-4.
H. M. Chauris, et al.; "Migration velocity analysis from locally coherent events in 2-D laterally heterogeneous media, Part I: Theoretical aspects"; Geophysics, vol. 67 No. 4; Jul.-Aug. 2002; pp. 1202-1212.
P. Guillaume, et al.; "3D Finite-offset tomographic inversion of CRP-scan data, with or without anisotropy"; 71st Annual International Meeting SEG, Expanded Abstracts, Sep. 2001; pp. 31-34.
P. Guillaume, et al.; "Refined depth imaging based on flexible finite-offset tomography"; SEG/EAGE Research Workshop; Sep. 4, 2003; pp. 1-4, Trieste, Italy.
S. Jin; "Constrained non-linear velocity inversion of seismic reflection data"; SEG Technical Program Expanded Abstracts 1999; pp. 1259-1262.
G. Lambaré; "Stereotomography"; Geophysics, vol. 73, No. 5; Oct. 1, 2008; pp. VE25-VE34.
J. P. Montel, et al.; "Non-linear slope tomography: extension to MAZ and WAZ"; 72nd Ann. Internat. Mtg. EAGE; Jun. 14-17, 2010; pp. 1-5; , Spain.
J. P. Montel, et al.; "Kinematic invariants describing locally coherent events: an efficient and flexible approach to non-linear tomography"; 71st Ann. Internat. Mtg. EAGE; Jun. 8-11, 2009; pp. 1-5.
D. Sinoquet; "Modeling a Priori Information on the Velocity Field in Reflection Tomography"; 1998 SEG Expanded Abstracts, Sep. 26-30, 1993; pp. 592-595.
P. Sexton, et al.; "3D anisotropic velocity estimation by model-based inversion of pre-stack traveltimes." SEG Technical Program Expanded Abstracts 1998 Society of Exploration Geophysicists, 1998; pp. 1855-1858.

C. Taillandier, et al.; "3-D refraction travel-time tomography algorithm based on adjoint state techniques"; Expanded Abstracts, 70th Annual EAGE Meeting, Jun. 9-12, 2008; pp. 1-5; Rome, Italy.
M. J. Woodward, et al.; "Automated 3D tomographic velocity analysis of residual move-out in pre-stack depth migrated common image point gathers"; SEG abstracts; 1998; pp. 1-4.
M. J. Woodward, et al.; "A decade of tomography"; Geophysics, vol. 73, No. 5, Oct. 1, 2008; pp. VE5-VE11.
C. A. Zelt, et al.; "3D simultaneous seismic refraction and reflection tomography of wide-angle data from the central Chilean margin" Department of Geology and Geophysics, Rice University; Geophys Res. Lett., 26; Aug. 15, 1999 pp. 2577-2580.
European Office Action in corresponding European Application No. 15 711 564.3 dated Dec. 7, 2017.
K. Broto, et al.; "Anisotropic traveltime tomography for depth consistent imaging of PP and PS data"; Geophysics, vol. 22, No. 2; XP055215948; Feb. 1, 2003; pp. 114-119.
P. Guillaume, et al.; "Kinematic invariants: an efficient and flexible approach for velocity model building"; SEG Technical Program Expanded Abstracts 2008; XP055137075; Nov. 14, 2008; pp. 3687-3692.
Partial International Search Report in related International Application No. PCT/IB2015/000236, dated Oct. 2, 2015.
International Search Report in related International Application No. PCT/IB2015/000236, dated Dec. 8, 2015.
Written Opinion of the International Searching Authority in related International Application No. PCT/IB2015/000236, dated Dec. 8, 2015.
F. Audebert et al., "Can Joint PP and PS Velocity Analysis Manage to Corner δ, the Anisotropic Depthing Parameter?", EAGE 64th Conference & Exhibition, Florence, Italy, May 27-30, 2002, pp. 1-6.
O. Birkeland et al., "PP-PS Tomography, Brazil Example", 76th EAGE Conference & Exhibition 2014, Amsterdam RAI, The Netherlands, Jun. 16-19, 2014.
K. Broto et al., "Anisotropic Traveltime Tomography for Depth Consistent Imaging of PPand PS Data", The Leading Edge, Feb. 2003, pp. 114-119.
P. Cai et al., "Tomographic Velocity Analysis of PP- and PS-Waves for VTI Media: Field-Data Application", EAGE 75th Conference & Exhibition, London, United Kingdom, Jun. 10-13, 2013, pp. 131-136.
L.A.D. D'Afonseca et al., "S-Ray Approximation Tomography for PP and PS Horizon Co-Depthing", 76th EAGE Conference & Exhibition 2014, Amsterdam RAI, The Netherlands, Jun. 16-19, 2014.
S.-K. Foss et al., "Depth-Consistent Reflection Tomography Using PP and PS Seismic Data", Geophysics, Sep.-Oct. 2005, vol. 70, No. 5, pp. U51-U65.
P. Guillaume et al., "Kinematic Invariants: an Efficient and Flexible Approach for Velocity Model Building", SEG Annual Meeting, Las Vegas, Nevada, 2008, pp. 3687-3692.

* cited by examiner

800

JOINTLY INVERTING PRIMARY WAVE (PP) AND SHEAR WAVE (PS) SEISMIC DATA AS PART OF A NONLINEAR TOMOGRAPHY PROCESS WHICH ADHERES TO ONE OR MORE CO-DEPTHING CONSTRAINTS

FIG. 8

VELOCITY MODEL BUILDING FOR SEISMIC DATA PROCESSING USING PP-PS TOMOGRAPHY WITH CO-DEPTHING CONSTRAINT

RELATED APPLICATION

The present application is related to, and claims priority from U.S. Provisional Patent Application No. 61/926,449, filed Jan. 13, 2014, entitled "S-Ray Approximation Tomography for PP and PS Horizon Co-Depthing", to Patrice Guillaume, the disclosure of which is incorporated herein by reference.

TECHNICAL FIELD

Embodiments of the subject matter disclosed herein generally relate to methods and systems for seismic image acquisition and, more particularly, to mechanisms and techniques for generating velocity models used in seismic data processing.

BACKGROUND

Seismic data acquisition and processing techniques are used to generate a profile (image) of a geophysical structure (subsurface) of the strata underlying the land surface or seafloor. Among other things, seismic data acquisition involves the generation of elastic waves and the collection of reflected/refracted versions of those elastic waves to generate the image. This image does not necessarily provide an accurate location for oil and gas reservoirs, but it may suggest, to those trained in the field, the presence or absence of oil and/or gas reservoirs. Thus, providing a more accurate image of the subsurface, and preferably in a shorter period of time, is an ongoing process in the field of seismic surveying.

As will be appreciated by those skilled in the art, a significant challenge in land and marine-based seismic data analysis involves how to build a velocity model of the subsurface which is being imaged. In particular building a velocity model for depth imaging becomes even more challenging when using multicomponent receivers to record the wave energy, e.g., receivers using hydrophones, geophones and/or accelerometers, since such multicomponent data requires two data sets to be processed, i.e., pressure or primary waves (P-waves and PP data) and converted or shear waves (S-waves and PS data), to build the model. Not only does this result in more seismic data to be processed, but the processing also typically involves inverting for more parameters with the seismic data not being strongly cross-coupled with the extra parameters which are introduced, i.e., P data do not constrain the S velocity and S data only weakly constrains P data. Such multicomponent data is frequently generated from ocean bottom cable (OBC) or ocean bottom node (OBN) acquisitions.

In multicomponent imaging, PP reflections and PS wave reflections are usually processed separately to produce two complementary images. The PP image is obtained by mapping the recorded energy using wave field modelling in the P-wave velocity model from both the source and the receiver side; on the other hand, PS images are constructed by modelling a P-wave on the source side and mapping the reflections using the S-wave velocity model for wave field modelling.

The two images are generally different: they represent the different reflectivity of P- and S-converted waves, they have different frequency content and spatial resolution, and they are affected differently by attenuation. However, the position of the main reflectors and interfaces in the two images should in most cases almost coincide when the velocity models used for imaging are accurate. Co-depthing refers to the process of correcting the P- and S-wave velocity models by constraining the depth of the events to the same, or close to the same, spatial location.

A typical approach to building these velocity models is illustrated in the flow diagram of FIG. 1. Therein, at step 100, the P-velocity model is built first using conventional techniques associated with single component, e.g., streamer acquisition, data. Using the P-velocity model, along with an estimate of the P to S velocity ratio, well logs, and potentially other available information, a first approximation of the S-velocity model is built at step 102. Using the first approximation of the S-velocity model, PS data can be migrated at step 104 to produce a PS depth image. From this image the PS residual moveouts (RMOs) can be evaluated and used to update the S-velocity model at step 106.

A typical way to update the velocity model at step 106 involves using a 1-D approximation (co-depthing) which assumes that the PS horizon 200 is consistently shallower or deeper than the PP horizon 202 (i.e., assuming there is a consistent velocity bias between the two horizons) as exemplified by FIG. 2(a), where 204 indicates the free surface, e.g., ocean surface. If this assumption holds, then the 1-D approximation can improve the S-velocity model. However if this assumption is incorrect and, for example, the PS horizon 202 is displaced laterally from the PP horizon 200 as shown in FIG. 2(b) and indicated by arrow 206, then the 1D update approach will fail to produce a meaningful update to the S-velocity model. In addition to this problem, the 1-D approach inherently fails to consider 3D horizon displacements.

Accordingly, it would be desirable to provide systems and methods that avoid the afore-described problems and drawbacks associated with velocity model building as part of an overall seismic data processing scheme.

SUMMARY

Methods and systems for velocity modelling of seismic data, and techniques for estimating parameters associated with velocity modelling, are described which address the afore-described problems.

According to an embodiment, a method for processing seismic data includes the step of jointly inverting primary wave (P) seismic data (PP data) and shear wave (P) seismic data (PS data) as part of a nonlinear tomography process which adheres to one or more co-depthing constraints.

According to an embodiment, a computer system for processing seismic data includes an interface configured to receive seismic data; and at least one processor configured to jointly invert primary wave (P) seismic data (PP data) and shear wave (S) seismic data (PS data) as part of a nonlinear tomography process which adheres to one or more co-depthing constraints.

According to an embodiment, a method for updating parameters associated with seismic data which includes pressure wave (PP) data and shear wave (PS) data includes the steps of computing matching filters between a PP image and a PS image at a plurality of lateral positions of the seismic data; and minimizing an objective function of non-zero lag coefficients of the matching filters.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 8 is a flowchart illustrating a method for processing seismic data according to an embodiment.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of marine seismic acquisitions. However, the embodiments to be discussed next are not limited to these configurations, but may be extended to other arrangements, e.g., land seismic acquisitions, as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments, methods and systems for jointly inverting PP and PS seismic data, estimating P and S propagation attributes (such as P and S velocity and the anisotropy parameters of the media through which the waves are propagating) while also adhering to one or more co-depthing constraints in a multi-layer nonlinear tomography process are described. According to various embodiments the one or more co-depthing constraints involve minimizing the discrepancies between kinematically re-migrated seismic reflectors in the PP and PS domains and/or honoring predetermined volumetric warping (matching 3D time delays) or Vp/Vs ratio information: from now on, warping or Vp/Vs ratio information will be referred to collectively as Vp/Vs ratio information. Different embodiments will be described below for each of these constraints.

The techniques associated with these embodiments involve, among other things, kinematical repositioning (for example through map-migration) of PP and PS main reflectors that preserves travel time, thus ensuring an accurate match with re-migrated seismic data. The joint inversion can estimate distinct propagation parameters for all layers as part of a common P and S multi-layer velocity model. When a nonlinear inversion is used according to some embodiments, the focusing and positioning of all inverted pieces of the PP and PS reflectors can be predicted in an updated velocity model and displayed for quality control (QC) purposes in the form of migrated facets, i.e., locally coherent events.

Figure 1:
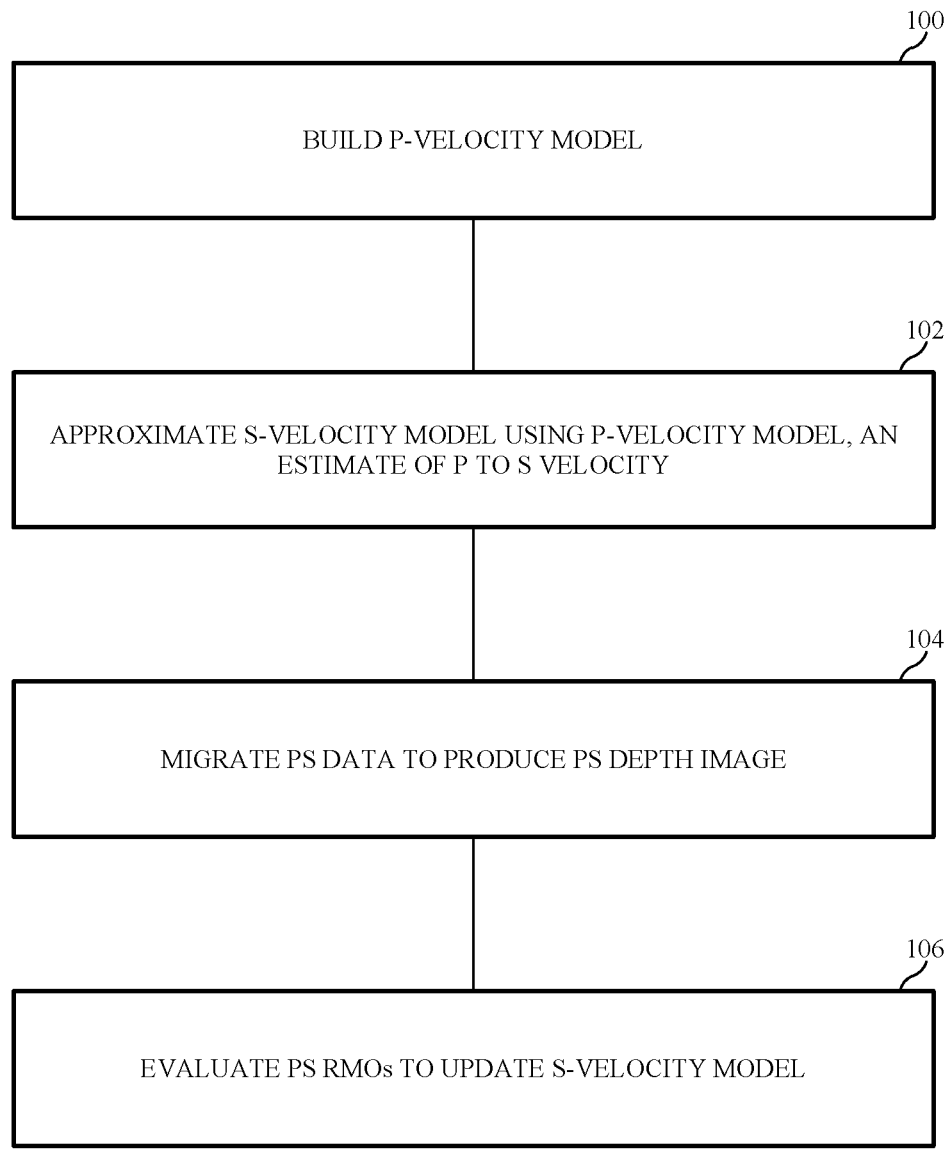
FIG. 1 is a flow diagram depicting a conventional technique for updating a velocity model associated with seismic data.
Figure 2A:
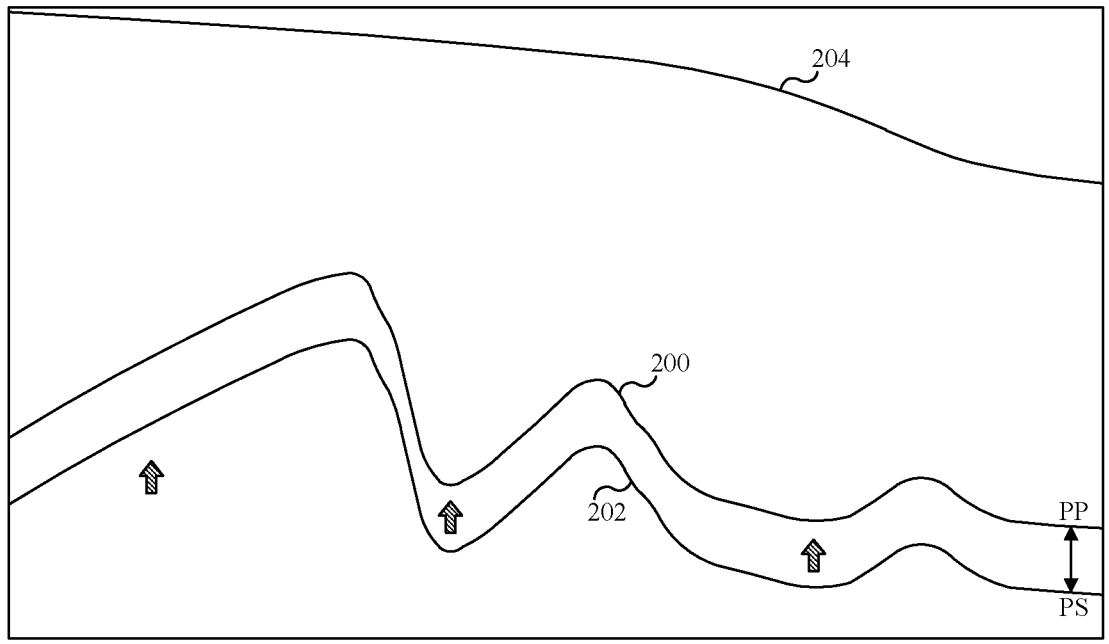
FIGS. 2(a) and 2(b) illustrate a problem with an assumption associated with the conventional technique for updating a velocity model shown in FIG. 1.
Figure 2B:
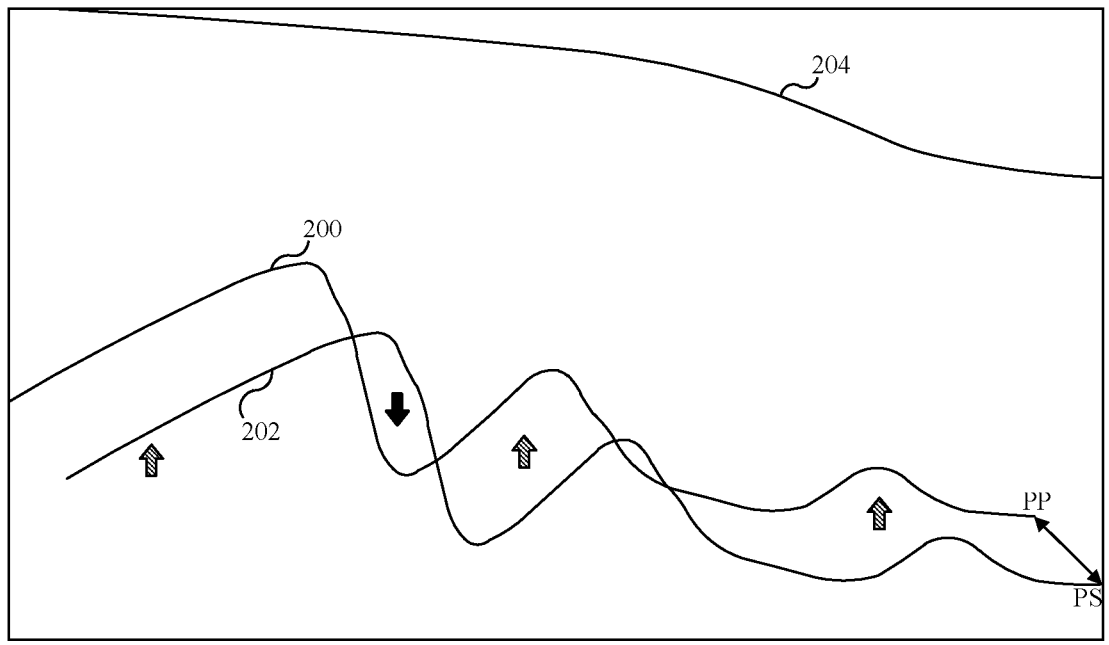
Figure 3:
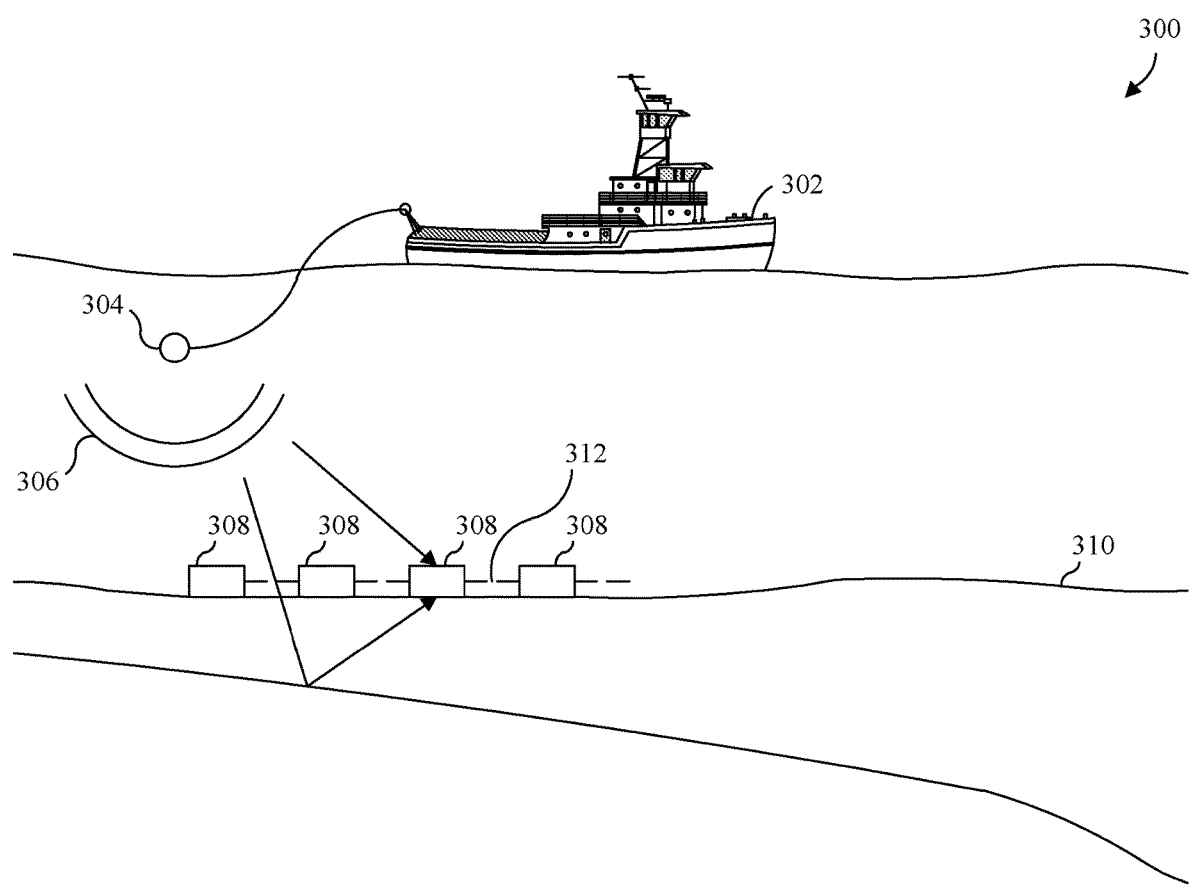
FIG. 3 shows an example of a marine seismic acquisition system which can be used to acquire seismic data that is processed according to an embodiment.

In order to provide some context for the subsequent more detailed embodiments related to velocity modeling, consider first a seismic data acquisition process and system as will now be described with respect to FIG. 3. In FIG. 3, a marine seismic data acquisition system 310 includes a ship 302 towing one or more sources, e.g., airguns, 304 for generating elastic waves 306. Receivers 308 are disposed on the ocean floor 310 and linked together via a cable 312. The elastic waves 306 generated by the source(s) 304 propagate downward, reflect off of, and penetrate (refract in) the ocean floor 310, wherein the refracted waves eventually are reflected by one or more reflecting structures (e.g., subsurface layer 314) back to the ocean floor's surface as the P and S waves mentioned in the Background section above. The reflected P and S waves then propagate upward and are detected by the receivers 308 disposed on the ocean floor 310 to, for example, which record the waves to generate the two data sets described above when the receivers 308 include multi-component elements. This process is generally referred to as "shooting" a particular seafloor area, with the seafloor area referred to as a "cell" and the sea surface referred to as a "free surface."

Note that although FIG. 3 shows, as an example, an ocean bottom cable type of marine seismic acquisition system, the present invention is not limited to the processing of seismic data acquired via such systems and can be applied to seismic data acquired via other types of acquisition systems, e.g., land-based seismic acquisition systems, ocean bottom node (OBN) systems, or a combination of streamer-based acquisition systems and OBC/OBN systems.

The data associated with the received seismic elastic waves is subsequently processed to, for example, generate an image of the subsurface for review by experts to identify potential areas where natural resources may be located. As will be appreciated by those skilled in the art, this processing typically involves a number of different steps or subtypes of processing including, for example, one or more of deconvolution, gathering, stacking, velocity model building and migration. Of particular significance for this particular application is velocity model building.

Figure 4A:
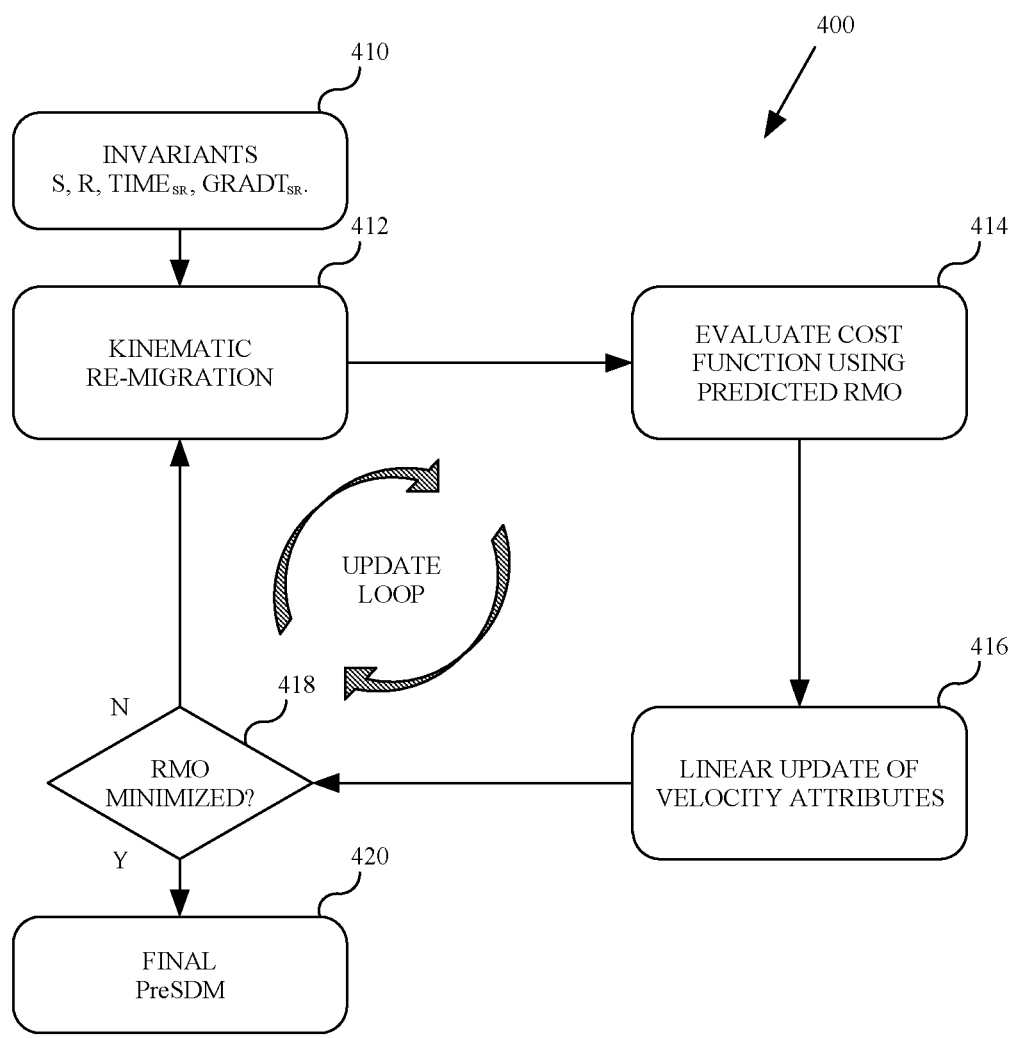
FIGS. 4(a) and 4(b) depict a conventional single layer nonlinear tomography process for seismic data.
Figure 4B:
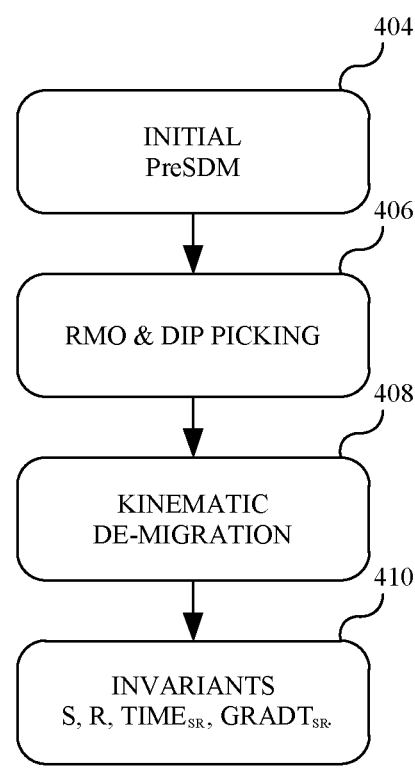

As a starting point for the more detailed discussion of the multi-layer nonlinear tomography embodiments mentioned above, consider first of all a conventional, single layer invariants-based residual moveout (RMO) non-linear tomography methodology illustrated in FIGS. 4(a) and 4(b). This conventional, single layer invariants-based RMO inversion methodology is described in U.S. Pat. No. 6,577,955 (hereafter the "955 patent"), the disclosure of which is incorporated here by reference, and the interested reader is directed to the '955 patent for more details regarding this process.

Briefly, however, as the embodiments build upon this progression, the inputs to the process 400 shown in FIG. 4(a) are various invariant values S, R, $TIME_{SR}$, and $GRADT_{SR}$ at input block 402. In this context the invariants input at 402 are combinations of model independent data (typically source and receiver positions (S and R), two-way traveltimes (TIME$_{SR}$) and traveltime slopes (GRADT$_{SR}$) in acquisition spatial or redundancy directions) which characterize an observable locally coherent piece of a seismic reflector and can be generated as illustrated in FIG. 4(b). Therein, using an initial migrated image of the recorded seismic data 404, i.e., the initial prestack depth migration data, picking 406 and finite-offset de-migration 408 processes are applied to acquire the desired invariants for use in the RMO inversion of FIG. 4(a). The invariants based method makes it possible to start the workflow from different types of data, e.g., pre-migration time data, migrated time data or depth migrated data. The invariants based method also makes it possible to start the model estimation with any starting velocity model, whereas in conventional methods inverting data picked in the image domain, the starting model should be the migration model having served for computing the RMO data to be inverted.

Returning to FIG. 4(a), the invariants-based RMO inversion performs an update loop including steps 412-418 during which the velocity model is iteratively updated until the RMO is minimized at step 418. Specifically, in block 412, a kinematic forward modelling process of the inversion data is performed. This step can include, for example, kinematically re-migrating RMO invariants in the current model, resulting in new facet positions and new predicted RMOs. From the output of step 412, a cost function can be evaluated process box 414 by measuring discrepancies between observed data and data re-modelled in the current velocity model, e.g., the predicted RMOs. Step 416 is an inverse modelling step where model parameters are updated by solving a linearized system of equations built from the cost function output of step 414. Step 418 is a step wherein convergence of the inversion is tested: the iterative updating process in the update loop can stop if the objective function has reached a minimum (or similar value) or if the model update is becoming small enough. Output 420 indicates the final updated model/object after the iterative loop (including the forward+inverse modelling steps described above). As mentioned above, those desiring more information regarding the processing of the seismic data indicated in the single layer, nonlinear tomography inversion described above with respect to FIGS. 4(a) and 4(b) are referred to the above incorporated by reference '955 patent.

Figure 5A:
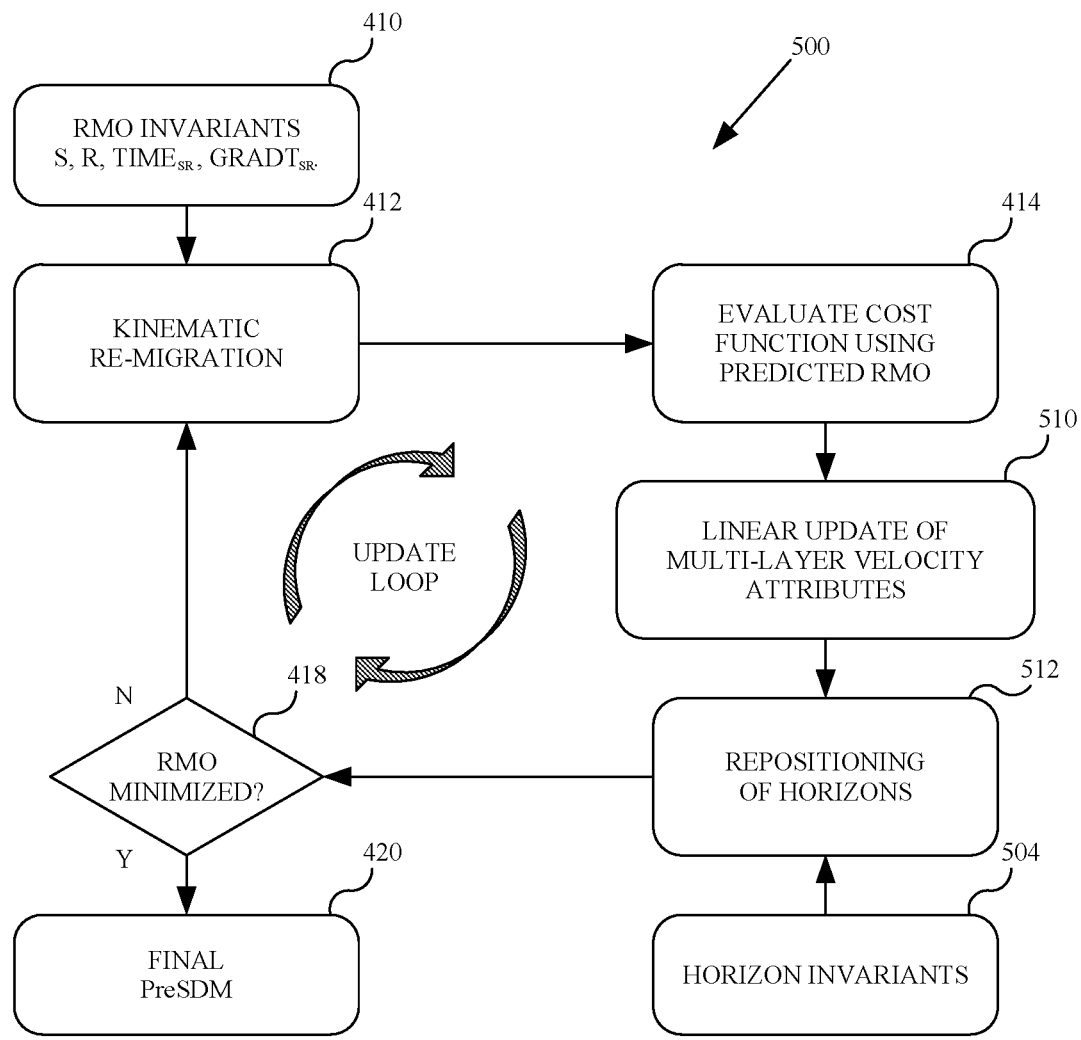
FIGS. 5(a) and 5(b) show a conventional multi-layer nonlinear tomography process for seismic data.

FIG. 5(a) shows another, more recent version of a non-linear slope tomography for seismic data which has now been extended to be for a multi-layer velocity model. Therein, those steps/processes which are the same or similar to those performed above with respect to the single layer nonlinear tomography of FIGS. 4(a) and 4(b) are labeled with the same reference numeral and their description is not repeated here for conciseness.

Figure 5B:
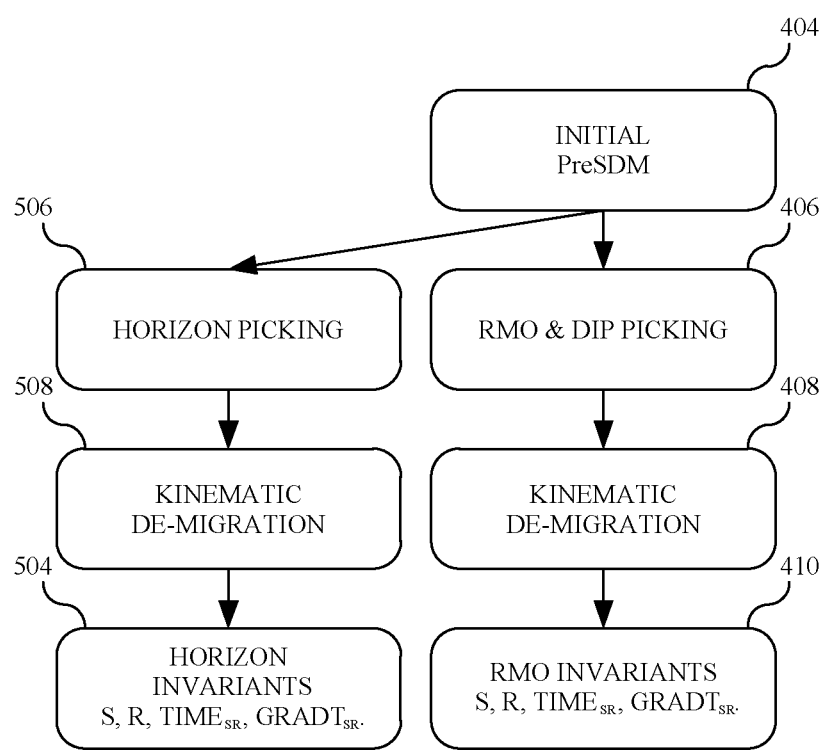

Therein the conventional multi-layer nonlinear tomography 500 again starts with, as its inputs, certain invariants represented by blocks 410 and 504. One way to establish the input invariants is shown in FIG. 5(b). Therein, the RMO invariants 410 are established in the same manner as described above with respect to FIG. 4(b) and steps 404-410. However, additionally, the multi-layer process 500 uses horizon invariants 504 which are determined by performing horizon picking 506 on the initial preSDM data 404, and then performing kinematic de-migration 508 on the results from the horizon picking.

Returning now to FIG. 5(a), the update loops begins with kinematic re-migration 412 and evaluating a cost function 414 using predicted RMO values output from the kinematic re-migration, as described above with respect to FIG. 4(a). However, unlike step 416 in the single layer process of FIG. 4(a), step 510 of the multi-layer process of FIG. 5(a) updates a multi-layer set of velocity attributes by solving a linear system of equations. Moreover, the multi-layer process 500 also includes a step 512 involving repositioning of the horizons 512 using the horizon invariants and an output of the updated velocity attributes from step 510. The horizons of interest here are the horizons acting as layer boundaries in the multi-layer velocity model. Layer boundaries basically allow describing sharp velocity contrasts in the subsurface as the 3D grids describing the velocity attributes in each layer may have different values on both sides of a position sitting on layer boundary. Again, as in the single layer version of this tomography, the loop iterates until the RMO criterion is met at step 418 and then a final image (preSDM data) is output at 420.

With these examples of conventional single layer and multilayer non-linear tomography in mind, and as mentioned earlier, embodiments instead combine a joint PP-PS inversion which is constrained by co-depthing information with the afore-described invariant-based inversion to achieve a number of beneficial results in the processing of seismic data. As will be appreciated by those skilled in the art, co-depthing refers to the process of correcting the P- and S-wave velocity models by constraining the depth of the PP and PS events to the same spatial location. In this context co-depthing applies to key interpreted horizons and/or to volumetrically picked locally coherent events that have been matched through warping. Warping is an existing mechanism by which elements s (i.e., locally coherent seismic events in this case) are related or associated from different 3D PP and PS images. Matching information resulting from warping referred to as volumetric Vp/Vs ratio feeds the inversion together with the RMO and other more conventional items such as regularization, structural smoothing, etc. For example, embodiments simultaneously invert PP and PS RMO data together with optionally other data mentioned above (e.g., VSP, wells info, dip distortions, etc.) to enable simultaneously estimating P and S propagation attributes such as P and S velocity and/or Tilted Orthorhombic (TORT) anisotropy parameters. Note that, in this context, reference to PS data refers to both forward and reverse PS information.

Additionally the co-depthing constraint options provide additional benefits. For example, according to one embodiment, the discrepancies between kinematically re-migrated (zero-offset or finite offset) key seismic reflectors in PP and PS are minimized by adding an additional weighted term to the cost function which is used to update the multi-layer velocity attributes. Alternatively, or additionally, another co-depthing constraint minimizes volumetric Vp/Vs discrepancies between pseudo-observed Vp/Vs values and model values for each piece of a reflector in the subsurface by adding a different additional weighted term to the cost function. More detailed examples including these two exemplary co-depthing constraints will now be described with respect to FIGS. 6(a)-6(d).

Figure 6A:
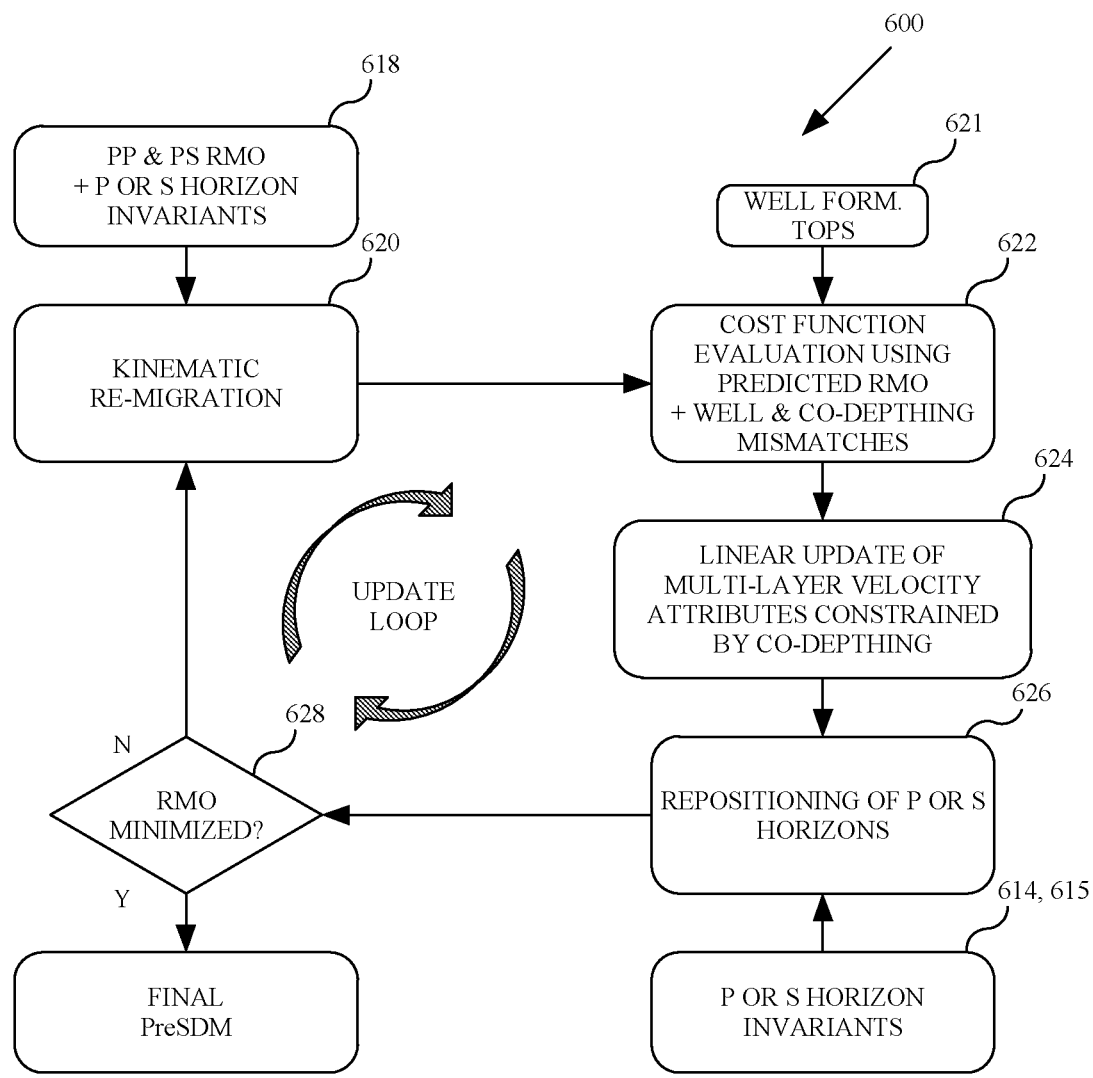
FIGS. 6(a) and 6(b) depict a joint PP-PS inversion tomography process with co-depthing constraint according to an embodiment.
Figure 6B:
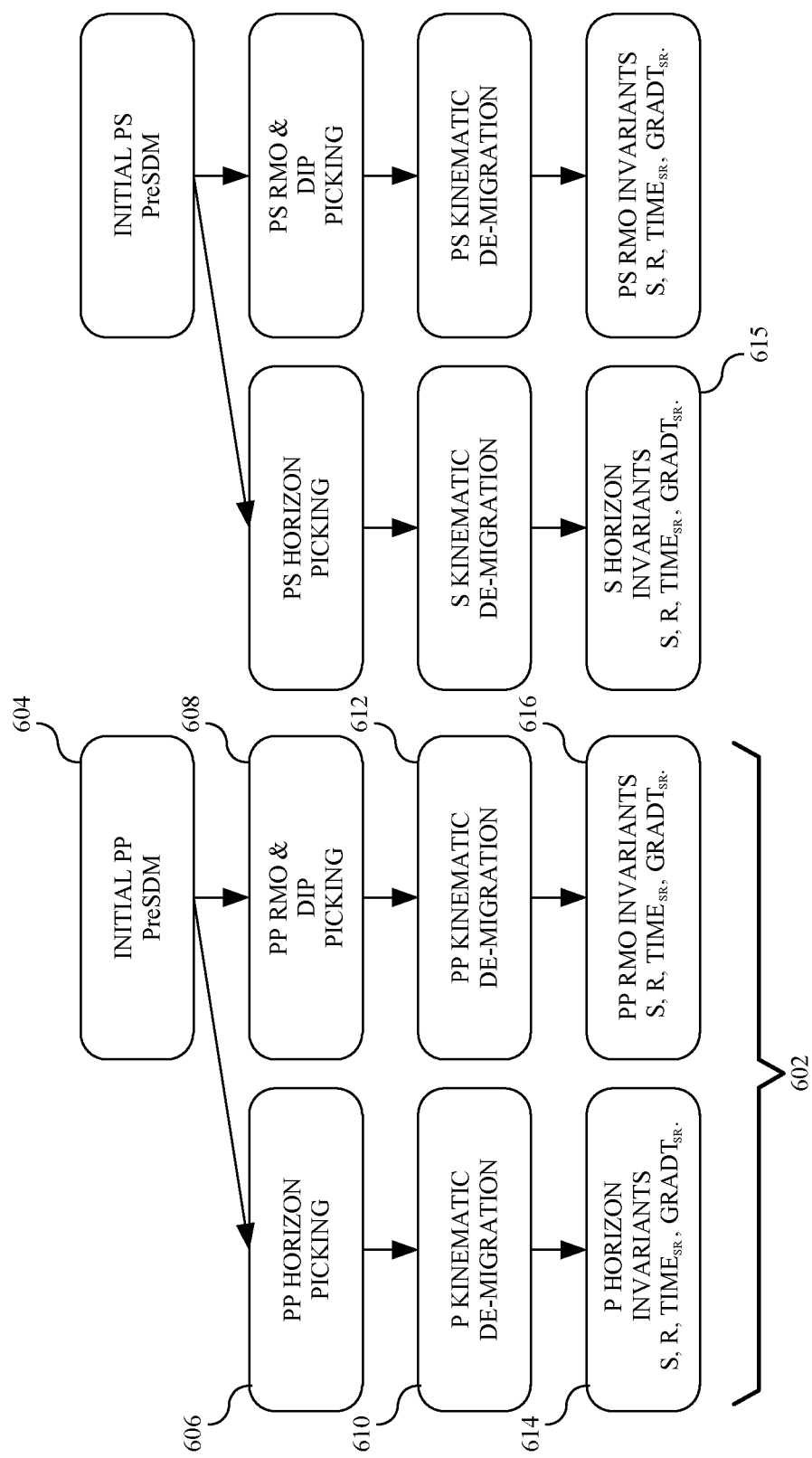

FIG. 6(a) depicts an example of combined non-linear slope tomography with joint PP-PS inversion 600 according to an embodiment. Certain inputs to the process 600 are first determined as shown in FIG. 6(b) based on the initial pre-stack depth migrated seismic data (PreSDM). Therein, the branch 602 begins with an initial P velocity model 604, which is subjected to pre-stack depth migration of the PP data. In this embodiment, as will be known by those skilled in the art, PreSDM refers to a technique whereby the recorded seismic events are re-located (migrated) in space relative to the location at which they were recorded since seismic receivers don't directly provide accurate depth information associated with the recorded seismic events. This PreSDM data is then subjected to both PP horizon picking 606 and PP RMO/Dip picking 608. Horizon picking refers to identifying (picking) e.g., locally coherent events on the seismic image associated with reflections and RMO (or dip) picking refers to a distortion/correction in the migration result which characterizes inaccuracies in the velocity model which was used to perform the migration. After steps 606 and 608 are performed on the initial PP PreSDM data, a kinematic map (depth) de-migration process 610, 612 is performed on both outputs to generate the desired P horizon invariants and the PP RMO invariants 614 and 616, respectively. Similar processing of the initial PS PreSDM is illustrated in FIG. 6(b) to generate the S horizon invariants and the PS RMO invariants.

Returning to FIG. 6(a), both the PP and PS RMO invariants are used as inputs 618 to a kinematic re-migration process 620 which starts the update loop for this embodiment. As in the earlier discussed single layer and multi-layer nonlinear tomography processes of FIGS. 4(a) and 5(a), respectively, this step involves a kinematic forward modelling inversion of the seismic data using the input PP and PS invariants which generates new facet positions of the seismic data and new predicted RMO values. However, unlike those earlier described processes, this step can also involve re-migrating the PP-PS co-depthing data.

The predicted RMO values from step 618, in addition to optional well formation tops input 621, are provided to the cost function evaluation process 622. A detailed example of a cost function which can be used in step 622 is provided below as equation (1). However, as generally indicated in FIG. 6(a), the cost function evaluates, among other things, the predicted RMO values (as in the multi-layer cost function 414) but also now the well and co-depthing mismatches as will be further described below. As will be appreciated by those skilled in the art, well formation tops input 621 refers to information that is derived from well analysis and contains space coordinates of formation tops which are key horizons in the subsurface. Well formation top information can also be extrapolated in between wells, in which case it is made of continuous horizons describing target formation tops. This information, which is independent from Vp/Vs warping information, can be used to constrain (through an additional term in the cost function) the positioning of layer boundaries during the tomographic inversion.

The process then proceeds to step 624 where a linear update of the multi-layer velocity attributes is performed by solving a system of linear equations. Step 624 performs an inverse modelling process where model parameters are updated by solving a linearized system of equations built from the cost function of step 622. The system of equations to solve contains, in particular, equations that will contribute to the enforcement of PP-PS co-depthing. Thus, unlike the multi-layer velocity update performed in step 510 of method 500, the attribute update performed in step 624 (usually involving both Vp and Vs model parameters) is now constrained by one or more co-depthing attributes by way of their usage in the cost function of step 622. Various examples of co-depthing constraints are provided below.

Figure 6C:
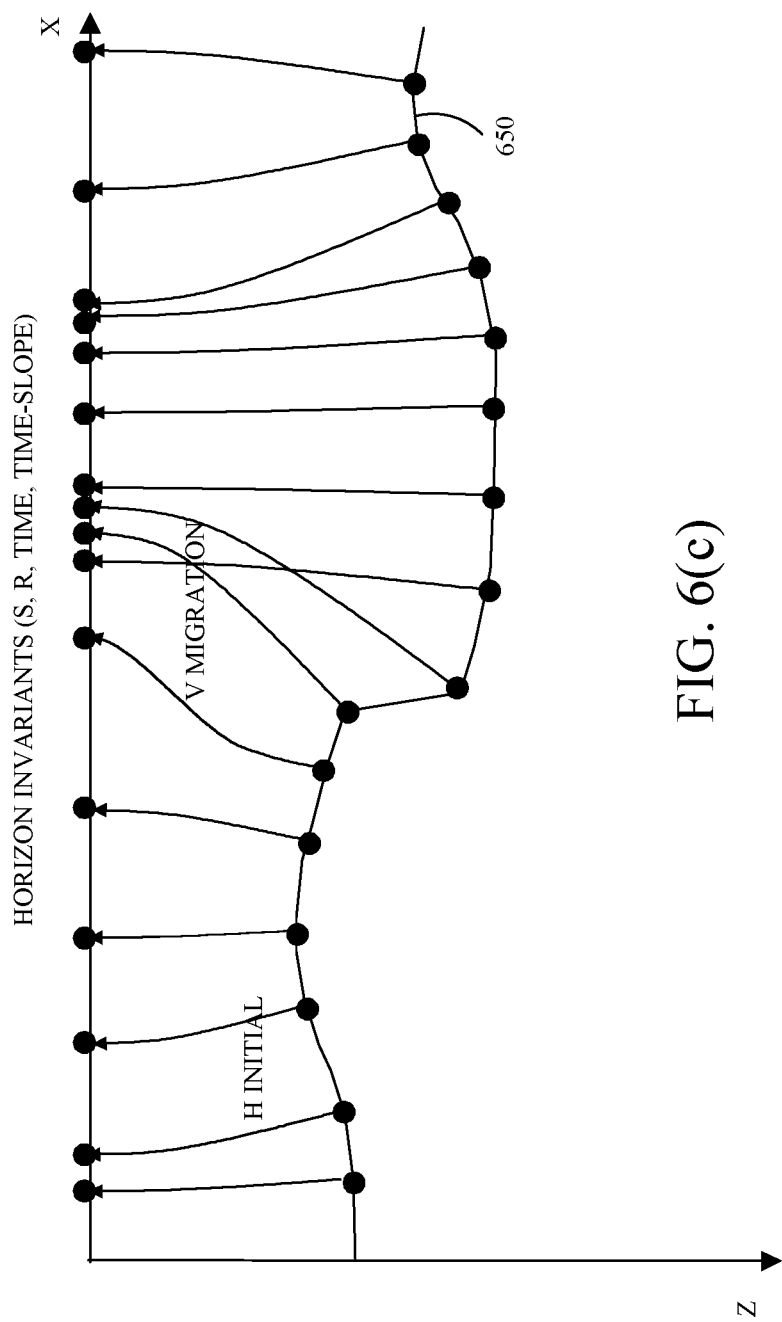
FIGS. 6(c) and 6(d) show steps associating with repositioning horizons in the embodiment of FIGS. 6(a) and 6(b)
Figure 6D:
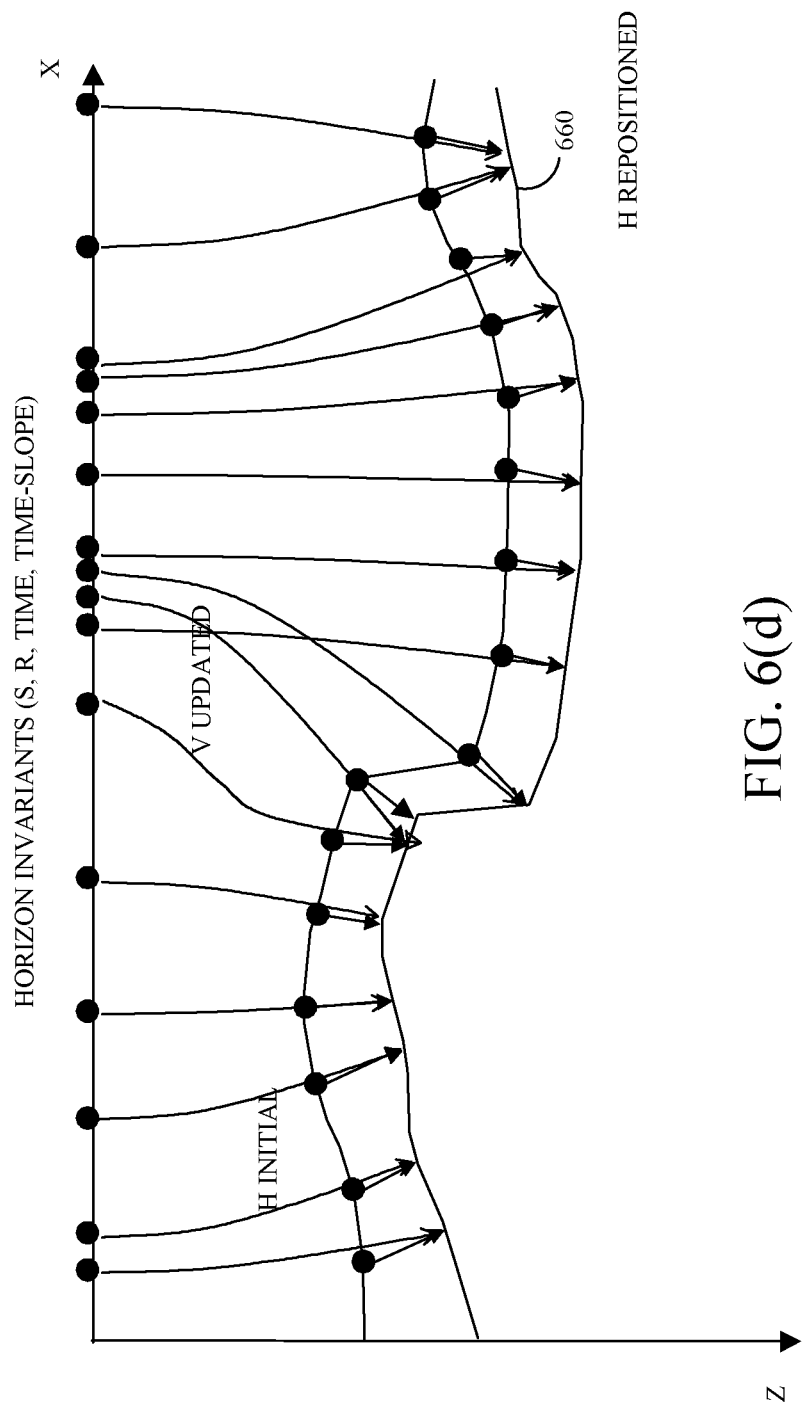

Next, the P and/or S horizons are repositioned at step 626 using the P and/or S horizon invariants which were determined as shown in FIG. 6(b). In this step, the layer boundaries of the image associated with the seismic data (i.e., the main horizons in the model) are repositioned by map-migration using the just updated velocities, as part of the multi-layer approach. This process can, for example, be performed in two steps as shown in FIGS. 6(c) and 6(d). In the first step, shown in FIG. 6(c), reflection points associated with the horizon or layer boundary 650 are kinematically de-migrated using the previously determined (and stored) horizon invariants (P and/or S) based on a migration velocity ($V_{migration}$). Then, using an updated velocity ($V_{update}$), as shown in FIG. 6(d), the invariants are kinematically (map migration) migrated to a repositioned horizon 660 based on field of displacement vectors in a manner which preserves the morphology of the horizon or layer boundary.

Note that the repositioning of horizons in step 626 may be performed in different ways depending upon the desired implementation. Consider that the estimated position of a layer boundary in the velocity model is driven by reference reflecting information taken from either PP or PS data and that the purpose of the co-depthing constraint is to reconcile positions of reflectors in the PP and PS images. However, this objective can only be met (partially or totally) after the inversion. In the meantime discrepancies can be observed. Those discrepancies affect in particular the position of the layer boundaries in the velocity model for which a choice must be made: either the boundary will stick to PP image or to PS image according to user's choice in which case either the P or S horizon invariants are supplied to block 626, respectively. Alternatively, the algorithm could have implemented another choice, for example an intermediate/average position between PP and PS images.

After the horizons are repositioned at step 626, the data can be checked to determine if a stopping criterion is met, e.g., if the RMO associated with the evaluated cost function is less than a given threshold or if the model update becomes sufficiently small, at step 628. Possible non convergence (usually caused by conflicting or erroneous data) can also be detected at step 628. If so, final pre-stack depth migrated data (image) is output at 630 and if not another iteration of the update loop is performed.

In the embodiment of FIGS. 6(a)-6(d), the co-depthing constraint being applied in the linear update block 624 can, for example, be a reflector type of co-depthing constraint, i.e., where the discrepancies between kinematically re-migrated key seismic reflectors in PP and PS domains are minimized. In this context, a key reflector is a reflector that can be interpreted on both PP and PS images. For each position on the key reflector, the depth error between the PP or target/a priori horizon and the repositioned PS reflector (using kinematic migration) are compared to seek a minimum depth error. An example of a misfit function to be minimized as part of the joint PP-PS processing which uses a reflector type of co-depthing constraint is illustrated in equation (1) below.

While FIG. 6(a) describes one type of invariant-based inversion in which joint PP-PS inversion may be performed, other variations are also contemplated. For example, in addition to RMO and according to another embodiment, the inversion may also include the dip-constrained functionality described, for example, in U.S. patent application Ser. No. 14/152,217, the disclosure of which is incorporated herein by reference. Additionally, the starting inversion can also contain one or more of well-tie data, VSP first or reflected arrivals, surface seismics refracted/diving arrivals and a-priori information (geological, geo-mechanical, rock properties . . . ), etc., if desired for a particular implementation.

Moreover, as an alternative to, or in addition to, constraining the joint PP-PS inversion using the reflector co-depthing described above, according to another embodiment a volumetric co-depthing constraint can be used. In this embodiment volumetric Vp/Vs discrepancies between pseudo-observed Vp/Vs values and model values for each reflector in the subsurface are determined and used as a constraint on the tomography update. This volumetric co-depthing term is an additional weighted term provided to the cost function (an example of this is also provided below in equation (1). The initial Vp/Vs information typically derives from warped PP and PS N-dimensional images computed in various domains (such as a depth migrated domain, a time migrated domain or time pre-migration domain) which are closer to raw seismic observations, although according to another embodiment provided below the Vp/Vs information can be derived from stacked images directly in depth without image warping. This measured Vp/Vs ratio information can be mapped in, e.g., an invariants-like manner to less model-dependent data before being mapped again in the current depth model. A pseudo observed Vp/Vs ratio can be computed in the current velocity model at a given position and that pseudo observed Vp/Vs ration can then be compared to an actual Vp/Vs ratio computed at same position in the current velocity model. The Vp/Vs ratio in the current velocity model can be perturbed in order to minimize the discrepancies with the pseudo-observed Vp/Vs values which are recomputed at each internal inversion iteration.

The cost function term according to this embodiment can, for example, be either a difference of Vp/Vs ratios or a difference of Vs values for a given, fixed Vp value or a vector field of distance or time differences between PP and PS events. This embodiment thus provides a kinematical repositioning (through map-migration or kinematic finite-offset migration for example) of PP and PS main reflectors and Vp/Vs ratio data that preserves traveltime, thus insuring a good match with re-migrated seismic data. The de-migration mapping processes typically require a structurally conformable dip model usually picked from migrated image stacks for describing the events to demigrate, not the velocity model in which those events will be demigrated.

To illustrate an embodiment where both a reflector co-depthing constraint and a volumetric co-depthing constraint are used, consider the following, exemplary cost equation (1) below.

$$F = W_{codepth\_Refl}^* [\Sigma_{hor\_local\_events} W_i^* \|Z_{ps} - Z_{target}\|]^2 + W_{codepth\_Vol}^* [\Sigma_{hor\_local\_events} W_j^* \|VpVs_{mod} - VpVs_{obs}\|]^2 + \Sigma_{rmo\_facets} W_k^* \|dRMO\|^2 + W_{dip}^* [\Sigma_{dipfacets} W_l^* \|dip_{kinemig} - dip_{target}\|]^2 + W_{other}^* data\ term + Term_{laplacian} + Term_{structural\_smoothing} + damping +$$ (1)

Where:
$Z_{ps}$: modelled depth of PS horizon
$Z_{target}$: pseudo-observed horizon depth (a priori or PP)
$VpVs_{mod}$: Vp/Vs ratio in current model at given position (x,y,z)
$VpVs_{obs}$: pseudo-observed Vp/Vs ratio at given position (x,y,z) recomputed/remapped in current model from (soft a priori) volumetric field of Vp/Vs ratio resulting from warping of initial seismic images
$W_{codepth\_Refl}$=global weighting factor of reflector co-depthing term in cost function
$W_{codepth\_Vol}$=global weighting factor of volumetric Vp/Vs ratio co-depthing term in cost function
$W_{ijkl}$=individual variable weights applied to elementary contributors (typically locally coherent events) to all terms (RMO, dip, co-depthing . . . ) in cost function
$W_{dip}$, $W_{other}$ are other global weights (wrt reference RMO) applied to data terms This equation can be used as the cost equation which is being minimized as part of the joint PP-PS inversion of FIG. 6(a), i.e., in step 622, although those skilled in the art will appreciate that this cost function is purely illustrative and that numerous other cost functions and variants of this cost function could be used depending upon the desired implementation.

The estimation of the Vp/Vs ratio used in equation (1) is an important and challenging task in multicomponent seismic processing. The Vp/Vs ratio contains information about the lithology of the subsurface and is estimated from the recorded data. As noted above, the Vp/Vs ratio can be derived from warped PP and PS N-dimensional images computed in various domains (such as a depth migrated domain, a time migrated domain or time pre-migration domain). However, according to another embodiment, an automatic method to perform image registration in the depth domain and, if the P-wave velocity model is assumed to be known, estimate the S-wave velocity from the data, is described. The method involves, for example: the computation of matching filters between the PP and PS images at every lateral position; and the optimization of an objective function in order to minimize the non-zero lag coefficients of the matching filters. When the matching filters are "do-nothing" filters (one non-zero sample at zero lag), then the two images are registered. This embodiment for determining the Vp/Vs ratio will now be described in more detail.

Generally, the wave field-based registration problem associated with calculating the Vp/Vs ratio can be stated as follows. Two images of the subsurface can be constructed from PP and PS reflections by computing the zero-lag correlation between a modelled source wave field, $w_{s,i}^P$ (x, t) and the reconstructed receiver wave fields, $w_{r,i}^P$ (x, t) and $w_{r,i}^s$ (x, t) as:

$$R_{pp}(x) = \Sigma_i \int_0^T dt\ w_{s,i}^P(x,t) w_{s,i}^P(x,t),$$ (2)

$$R_{ps}(x) = \Sigma_i \int_0^T dt\ w_{s,i}^P(x,t) w_{r,i}^P(x,t),$$ (3)

where the superscript $^{P,S}$ indicates the type of wave, the subscript $_{s,r}$ indicates the source or receiver side, the index i spans the number of shots (experiments), x=(x, y, z) represents the spatial coordinates, and t the temporal coordinate.

The wave fields are solutions of the wave-equations, i.e.:

$$L^P(m) w_{s,i}^P(x,t) = f^P(x,t),$$ (4)

$$L^{*P}(m) w_{r,i}^P(x,t) = r^P(x,t),$$ (5)

$$L^{*s}(m) w_{r,i}^s(x,t) = r^s(x,t),$$ (6)

where the operator L is a wave equation operator, e.g., the d'Alembert operator, * indicates the adjoint operator, f is the source signature for the P-wave, and r indicates the receiver data (S or P, depending on the superscript). The matching filters $\alpha_{(x,y)}$ that map one image to the other can be defined as follows:

$$T_{(x,y)}^P \alpha_{(x,y)} = R_{ps,(x,y)}(z),$$ (7)

where $T_{(x,y)}^P$ is the Toeplitz matrix constructed for every column (fixed (x,y) position, varying depth z) of the PP image, and $R_{ps,(x,y)}(z)$ is the column (trace) of the PS image extracted at (x,y) for every depth z.

If both P- and S-wave velocity models are correct, then the positions of the reflectors in the two images will coincide, otherwise there will be a misalignment. This embodiment can measure the similarity between the two images using adaptive filters. If the two images have reflectors at the same location in space, then the filters that match the two images have energy clustered at zero lag. For example, an objective function J can be setup as:

$$J = \frac{|Za|^2}{|a|^2}, \tag{8}$$

where Z is a penalty operator that annihilates the value of the filter at zero lag and applies positive weights to non-zero lags. The gradient of the objective function in equation (8) can be computed using standard adjoint-state techniques and used to implement a local gradient-based optimization method to iteratively update (correct) the S-wave velocity model.

Numerous variations and adaptations of the foregoing PP/PS registration technique can also be implemented. For example, the input images to the process can be preconditioned to increase the initial similarity in terms of frequency content and/or the images can be computed using shot-encoding techniques. The wave field extrapolation can be performed in the frequency domain or in mixed time-spatial wavenumber domains. The wave-equation used to model the wave fields can be fully elastic with arbitrary anisotropy. The parameters inverted in order to perform the registration can be the stiffness coefficients or a combination of the stiffness coefficients. The matching filters can be made variables in space (localized with windows in depth) and/or can be computed along the horizontal directions. Both P-wave and S-wave velocity models can be simultaneously updated. The matching can be performed on partial images (for example, images computed from different azimuths).

The afore-described embodiment may thus be used in different situations. First, assuming the Vp model is accurate, this embodiment can be used to achieve co-depthing between the PP and PS images. Note that this usage can be independent of the embodiment of FIGS. 6(a)-6(d) associated with joint PP-PS inversion tomography. Second, assuming that the Vp model is inaccurate, this embodiment can then be used to modify the Vs model to achieve co-depthing, thus making the Vp/Vs ratio more accurate. This usage can be performed in conjunction with the embodiment of FIGS. 6(a)-6(d) to facilitate a more accurate constraint on the velocity attribute updates. Third, assuming that both the Vp and Vs models are inaccurate, this embodiment can be used to update both the Vp and Vs velocity models using only the co-depthing constraint as an optimization criteria, which usage can be independent of the embodiment of FIGS. 6(a)-6(d).

Additionally, it should be noted that this latter embodiment's image registration technique can be performed without explicit calculation of Frechét matrices and does not require inversion of a system of linear equations since it is based on adjoint-state calculations.

Volumetric constraints in addition to, or as alternatives to, using the Vp/Vs ratio described above are also possible according to other embodiments associated with FIGS. 6(a)-6(d). For example, other volumetric information resulting from 1D, 2D or 3D warping of PP and PS images (where PP and PS images can consist of partial image stacks in a given offset or angle range) can be used to generate a constraint term either in addition to the volumetric Vp/Vs term described above, or as an alternative thereto. Below are some examples of possible implementations and integration within tomography schemes of such alternative volumetric constraints.

For example, according to an embodiment, raw warped data can consist of a PS time cube, i.e., F(x, y, PP time), where converted PS time and PP time are, for example, vertical times, assuming that warping was done in the time domain and seismic data is obtained by converting depth migrated seismics to time using vertical group slowness. Then, in the tomography cost function of equation (1), the local-type Vp/Vs constraint applied in the volumetrically sampled subsurface can be replaced by equations which preserve PS traveltime. Note that this embodiment assumes mild 3D update effects.

Another 3D approach can involve warping of a PP stack cube with PS(h) constant offset/angle (or sub-offset range) cube which allows 3D finite-offset demigration to obtain pseudo-model-independent tomography data, referred to herein as "invariants". In this case the observed offset/angle dependent focusing error (i.e., RMO slope) to be demigrated would be derived from the warping volumetric result using an assumption to relate matched $Z_{ps(h)}$ and $Z_{pp}$ depths. In this case the invariants would be inverted rather than introduced as constraints and the input data cube can be expressed as $RMO_{ps(h)}$=F(x, y, $z_{pp}$). In both of the data warping examples described above, the data cube computed by the warping process does not need to have all of its entries filled with values because all of the individual pieces of information in the cube are independent from each other, whereas in the earlier described volumetric constraint embodiment, the Vp/Vs ratio must have all of its values filled in.

FIGS. 6(a)-6(d) depict various techniques for joint PP-PS inversion tomography with one or more co-depthing constraints according to embodiments, however those skilled in the art will appreciate that other such techniques can be derived by making adjustments thereto. For example, such other embodiments can include different combinations of the type/list of data to invert, the list of velocity and horizon parameters to estimate and/or the constraints to be considered.

The optimization process described herein can be linear or non-linear and can be local (through a gradient type optimization for example) or global (through a migration scan or stochastic approach) or a combination thereof. The local events to invert can be any type of locally coherent events, e.g., small portions of continuous reflectors described by spatial position and dip/slope data, that can be observed in common-offset, common-angle, common-receiver or common-shot collections/gathers of migrated seismic traces obtained, respectively, by any type of seismic migration, e.g. common-offset, common-shot or common-offset migration. Computing the dip of the re-migrated reflected events requires some implicit or explicit kinematic migration process (or tomographic ray tracing), at least for computing the tomographic rays as well as the Frechét derivatives associated with the data and co-depthing terms of the objective function, e.g., equation (1). Frechét derivatives and residuals constitute the A and b components of the Ax=b linear system to solve when a local optimization scheme is chosen.

Figure 7:
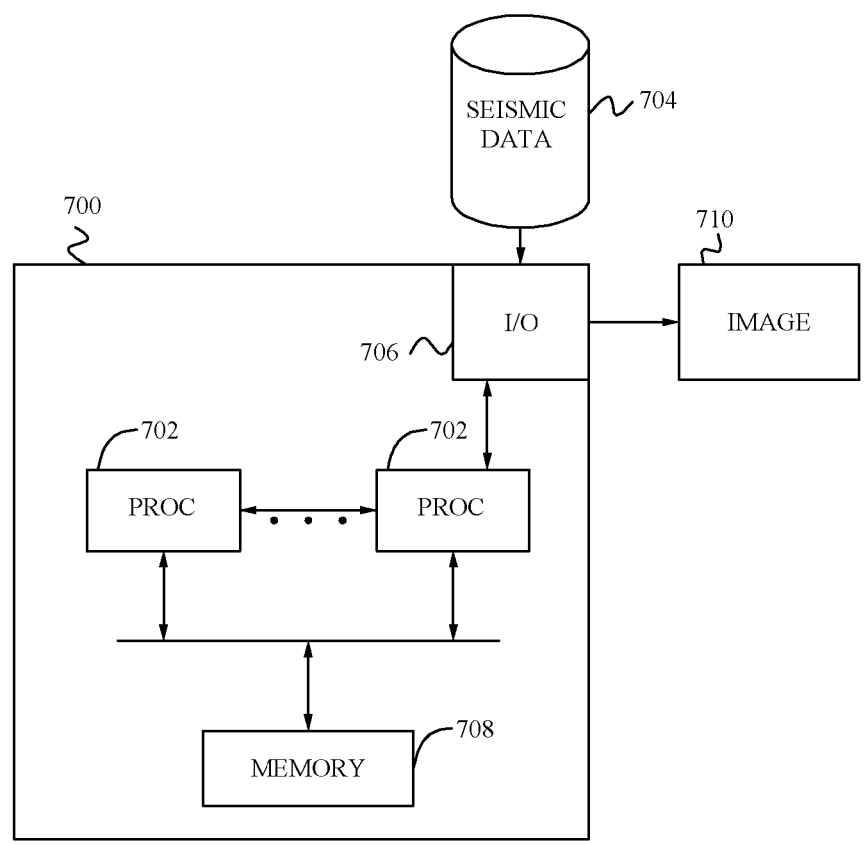
FIG. 7 is a system for processing seismic data according to an embodiment.
Figure 9:
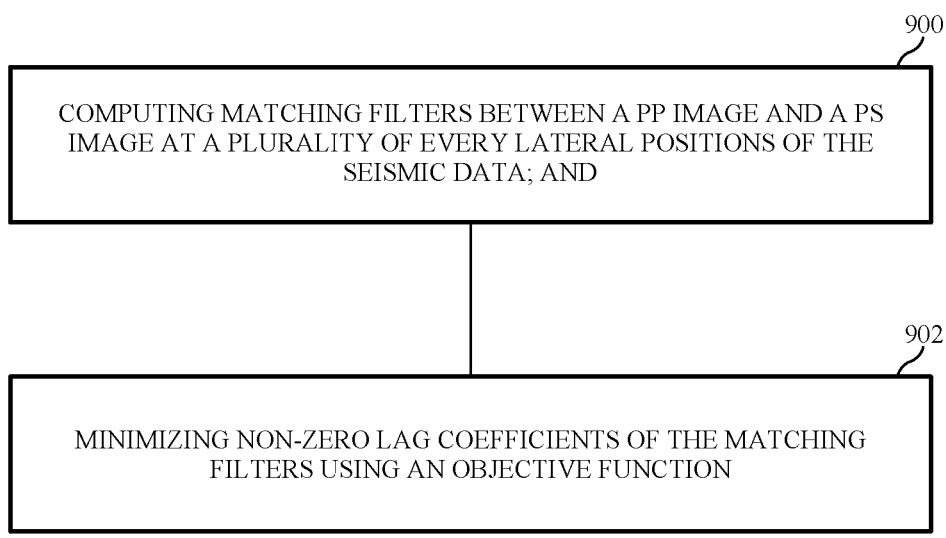
FIG. 9 is a flowchart illustrating a method for processing seismic data according to another embodiment.

The foregoing embodiments for joint PP-PS inversion tomography with co-depthing constraints have been described primarily in the context of methods or techniques. However, similar embodiments can be characterized as systems for processing the raw or partially processed seismic data that has been acquired by a system like that described above with respect to FIG. 3 (or other seismic acquisition systems). Such embodiments can take many forms such as the computing system 700 generally illustrated in FIG. 7). Therein, one or more processors 702 can receive input seismic data 704 via input/output device(s) 706. The data can be processed to perform joint PP-PS inversion tomography with co-depthing constraint(s) as described above and temporarily stored in the memory device 708 prior to the other processing. When the seismic data processing is complete, one or more images 710 of the subsurface associated with the seismic data can be generated either as a displayed image on a monitor, a hard copy on a printer or an electronic image stored to a removable memory device.

Methods in accordance with the foregoing embodiments can also be expressed in alternative fashions to those described above, e.g., with respect to FIGS. 6(a)-6(d). For example, as shown in the flowchart of FIG. 8, a method for processing seismic data can include the step 800 of jointly inverting primary wave (PP) and shear wave (PS) seismic data as part of a nonlinear tomography process which adheres to one or more co-depthing constraints. The disclosed embodiments describe, for example, systems and methods for performing joint PP-PS inversion tomography with co-depthing constraint(s) on seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic exploration processing seismic data acquired with multicomponent receivers over a subsurface, the method jointly inverting depth migrated primary wave (P) seismic reflection data (PP data) and depth migrated shear wave (S) seismic reflection data (PS data) by:
   picking P and S horizons, P and S residual moveouts (RMOs) and P and S dips for the depth-migrated PP and PS data;
   performing a kinematic de-migration of the picked P and S horizons, P and S RMOs and P and S dips to calculate P and S horizon invariants and PP and PS RMO invariants;
   performing a kinematically forward modelling inversion of:
      the PP and PS data using the PP and PS RMO invariants and the P and S horizon invariants to predict PP and PS RMO values, and
      PP-PS co-depthing data based on one or more image co-depthing constraints to calculate co-depthing mismatches;
   calculating a cost function based on the predicted PP and PS RMO values and the co-depthing mismatches;
   updating the P- and S-velocity models simultaneously to minimize the cost function; and
   detecting presence of oil and/or gas in the subsurface using an image generated based on the updated P- and S-velocity models.

2. The method of claim 1, wherein the one or more image co-depthing constraints includes reflectors co-depthing.

3. The method of claim 1, wherein the one or more image co-depthing constraints includes a volumetric constraint based on Vp/Vs discrepancies between pseudo-observed Vp/Vs values and model values for reflectors in the subsurface.

4. The method of claim 1, wherein the one or more image co-depthing constraints includes a reflector constraint which minimizes discrepancies between kinematically re-migrated seismic reflectors in PP and PS domains.

5. The method of claim 1, wherein the updating of the P- and S-velocity models simultaneously comprises:
   performing a linear update of multi-layer velocity attributes so as to minimize the cost function; and
   repositioning at least one of the P or S horizons corresponding to the at least one of P or S horizon invariants using the updated multi-layer velocity attributes.

6. The method of claim 5, wherein the performing of the kinematic de-migration, the performing of the kinematically forward modelling inversion, the calculating of the cost function, and the updating of the P- and S-velocity models simultaneously are iterated as part of an update loop until an exit criterion is satisfied.

7. The method of claim 6, wherein the image is generated based on the updated P- and S-velocity models by:
   outputting final pre-stack depth migrated seismic data using the updated P- and S-velocity models when the exit criterion is satisfied; and
   generating the image of the subsurface using the final pre-stack depth migrated seismic data.

8. The method of claim 6, wherein the exit criterion is the P and S RMOs be minimized.

9. A computer system for seismic exploration processing seismic data, the computer system comprising:
   an interface configured to receive seismic data acquired with multicomponent receivers over a subsurface; and
   at least one processor configured to jointly invert depth migrated primary wave (P) seismic reflection data (PP data) included in the seismic data and depth migrated shear wave (S) seismic reflection data (PS data) included in the seismic data by:
   picking P and S horizons, P and S residual moveouts (RMOs) and P and S dips for the depth-migrated PP and PS data;
   performing a kinematic de-migration of the picked P and S horizons, P and S RMOs and P and S dips to calculate P and S horizon invariants and PP and PS RMO invariants;
   performing a kinematically forward modelling inversion of:
      the seismic data using the P and S horizon invariants to predict PP and PS RMO values, and
      PP-PS co-depthing data based on one or more image co-depthing constraints to calculate co-depthing mismatches;
   calculating a cost function based on the predicted PP and PS RMO values and the co depthing mismatches;
   updating the P- and S-velocity models simultaneously to minimize the cost function; and detecting presence of oil and/or gas in the subsurface using an image generated based on the updated P- and S-velocity models.

10. The system of claim 9, wherein the one or more image co-depthing constraints includes reflectors co-depthing.

11. The system of claim 9, wherein the one or more image co-depthing constraints includes a volumetric constraint based on Vp/Vs discrepancies between pseudo-observed Vp/Vs values and model values for reflectors.

12. The system of claim 9, wherein the one or more image co-depthing constraints includes a reflector constraint which minimizes discrepancies between kinematically re-migrated seismic reflectors in PP and PS domains.

13. The system of claim 9, wherein the at least one processor is configured to update the P- and S-velocity models simultaneously by:

performing a linear update of multi-layer velocity attributes so as to minimize the cost function; and repositioning the at least one of P or S horizons corresponding to the at least one of P or S horizon invariants using the updated multi-layer velocity attributes.

14. The system of claim 9, wherein the at last one processor is configured to repeat the performing of the kinematic de-migration, the performing of the kinematically forward modelling inversion, the calculating of the cost function, and the updating of the P- and S-velocity models simultaneously as part of an update loop until an exit criterion is satisfied.

15. The system of claim 14, wherein the at least one processor is further configured to update the output final pre-stack depth migrated seismic data when the exit criterion is satisfied; and wherein the at least one processor and the interface are configured to generate the image of the subsurface using the final pre-stack depth migrated seismic data.

16. The system of claim 14, wherein the exit criterion is the P and S RMOs be minimized.

* * * * *